(No Model.)
J. R. BERRY.
Spindle Bolster for Spinning and Twisting Machines.
No. 236,482. Patented Jan. 11, 1881.
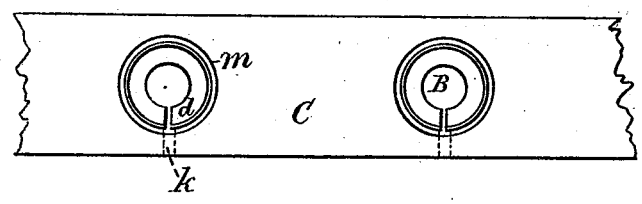
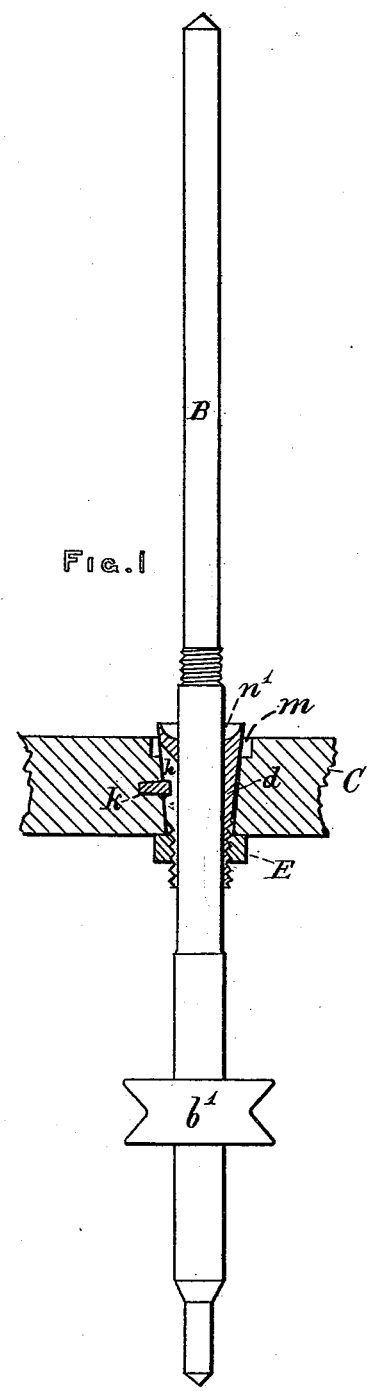
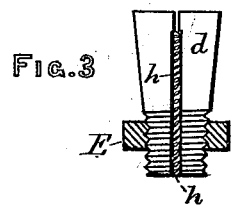
Witnesses
Park McFarland Jr.
John F. Grant.
Inventor
John R. Berry
per Edw. Brown attorney

UNITED STATES PATENT OFFICE.

JOHN R. BERRY, OF PHILADELPHIA, PENNSYLVANIA.

SPINDLE-BOLSTER FOR SPINNING AND TWISTING MACHINES.

SPECIFICATION forming part of Letters Patent No. 236,482, dated January 11, 1881.

Application filed June 10, 1880. (No model.)

*To all whom it may concern:*

Be it known that I, JOHN R. BERRY, of the city of Philadelphia and State of Pennsylvania, have invented a new and useful Spindle-Bolster for Spinning and Twisting Machines, of which the following is a specification.

My invention consists in combining with a spindle and bolster-rail a bolster, the latter being adapted to receive a wick for lubrication, all being constructed as hereinafter specified.

In the accompanying drawings, Figure 1 is a vertical section through the bolster, showing the spindle in place. Fig. 2 is a plan of the bolster as fitted in the bolster-rail. Fig. 3 is an outside view of the collar and nut.

Similar letters of reference indicate similar parts in the different views.

The spindle represented by B is driven at a high velocity by means of the band-pulley $b'$.

C is a part of the bolster-rail, into which a bolster, $d$, is fitted. This collar is bored out to fit the spindle. The outside of the bolster has a small taper, and the smaller end of the cone is threaded to receive the nut E. This conical bolster is slotted or cut through on one side, the slot $h$ being wide enough, except at the top, where it is narrower, to permit of the insertion of a small piece of wick for the purpose of lubrication. A key, $k$, projects from the bolster-rail C into the slot $h$, to prevent the collar from turning. The top of the cone is slightly concave at $n'$ to collect the oil, and a groove, $m$, is made in the bolster-rail around the top of the collar, to prevent the oil from flying off by centrifugal force. The tension of the belt which drives the spindle draws the belt against the solid side of the collar, or that opposite the slot $h$. As soon as any wear takes place and the spindle runs loosely the nut E is tightened, whereupon the collar $d$ is drawn farther into the bolster-rail C, the sides of the slot being compressed more closely together. The bearing of the spindle is thus fitted anew.

The thread of the nut E is slightly tapered to prevent the nut working loosely as the collar $d$ is compressed. A check-nut would partially answer the purpose.

I do not confine my invention to use on spindles of spinning-machines only, as it can be used in other classes of machinery where a similar effect is desired to be produced.

I claim as my invention—

The spindle B and bolster-rail C, the latter provided with an annular groove, $m$, a conical aperture concentric therewith, and a key, $k$, projecting into said aperture, combined with a tapering bolster, $d$, hollowed at $n'$, and having a longitudinal slot, $h$, inclosing a wick, and further provided with a threaded end and tightening-nut, E, substantially as and for the purposes specified.

JOHN R. BERRY.

Witnesses:
EDWD. BROWN,
JOHN F. GRANT.